(12) United States Patent
Fleming et al.

(10) Patent No.: US 9,374,135 B2
(45) Date of Patent: Jun. 21, 2016

(54) METHOD AND APPARATUS FOR ALERTING A USER TO PRESENCE OF AN ITEM IN A VEHICLE

(71) Applicant: Ford Global Technologies, LLC, Dearborn, MI (US)

(72) Inventors: Stephen David Fleming, Hockley (GB); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/173,695

(22) Filed: Feb. 5, 2014

(65) Prior Publication Data

US 2014/0218189 A1 Aug. 7, 2014

(30) Foreign Application Priority Data

Feb. 6, 2013 (GB) .................................. 1302101.9

(51) Int. Cl.
*B60Q 1/00* (2006.01)
*H04B 5/00* (2006.01)
(Continued)

(52) U.S. Cl.
CPC .......... *H04B 5/0025* (2013.01); *G08B 21/0275* (2013.01); *G08B 21/24* (2013.01)

(58) Field of Classification Search
CPC ............... G08B 21/24; G08B 13/1427; G08B 21/0227; G08B 21/0275; G08C 9/00182; G08C 2009/00261; H04B 5/0025
USPC ................. 340/568.1, 425.5, 539.13, 539.21, 340/539.23, 539.32, 457, 572.1, 572.8
See application file for complete search history.

(56) References Cited

U.S. PATENT DOCUMENTS

| | | | |
|---|---|---|---|
| 6,462,660 B1 * | 10/2002 | Cannon et al. | ............. 340/572.1 |
| 8,917,174 B2 * | 12/2014 | Morgan, Jr. | ............. 340/539.13 |
| 2006/0290319 A1 | 12/2006 | Burgan et al. | |

(Continued)

FOREIGN PATENT DOCUMENTS

| | | |
|---|---|---|
| GB | 2502590 A | 12/2013 |
| JP | 2005284771 A | 10/2005 |

(Continued)

OTHER PUBLICATIONS

European Patent Office, Search Report for the corresponding European Patent Application No. GB1302101.9 mailed Jun. 11, 2013.

(Continued)

*Primary Examiner* — Anh V La
(74) *Attorney, Agent, or Firm* — Frank A. MacKenzie; Brooks Kushman P.C.

(57) ABSTRACT

Method and apparatus for alerting a user to presence within a vehicle of an item having an active near-field communication device (NFCD) associated therewith, such as a smartphone. A passive NFCD is located adjacent to a storage compartment within a vehicle. When the active NFCD-equipped item is placed in the compartment, communication is established between the active and passive NFCDs. A controller device is communicatively connected to the vehicle to detect a journey completion event and send a wireless message (via Bluetooth, for example) to the item. The message instructs the item to output an alert if the active and passive NFCDs are in communication with one another. Journey completion events may be turning off of a vehicle ignition, opening of a vehicle door, or a vehicle seat becoming unoccupied.

20 Claims, 1 Drawing Sheet

(51) Int. Cl.
  *G08B 21/02*  (2006.01)
  *G08B 21/24*  (2006.01)

(56) References Cited

U.S. PATENT DOCUMENTS

| | | | |
|---|---|---|---|
| 2009/0079567 A1* | 3/2009 | Patel | 340/572.1 |
| 2011/0080300 A1* | 4/2011 | Bequette et al. | 340/686.6 |
| 2011/0084807 A1* | 4/2011 | Logan et al. | 340/10.1 |
| 2011/0148625 A1 | 6/2011 | Velusamy | |
| 2013/0012123 A1* | 1/2013 | DeLuca | 455/39 |
| 2013/0257604 A1* | 10/2013 | Mirle et al. | 340/425.5 |
| 2014/0011482 A1* | 1/2014 | Le et al. | 455/414.1 |

FOREIGN PATENT DOCUMENTS

| | | |
|---|---|---|
| JP | 2007286906 A | 11/2007 |
| JP | 2009271754 A | 11/2009 |
| JP | 2010055362 A | 3/2010 |
| KR | 2013008225 A | 1/2013 |

OTHER PUBLICATIONS

Intellectual Property Office, Examination Report for the corresponding Great Britain Patent Application No. GB1302101.9 dated Oct. 9, 2015.

* cited by examiner

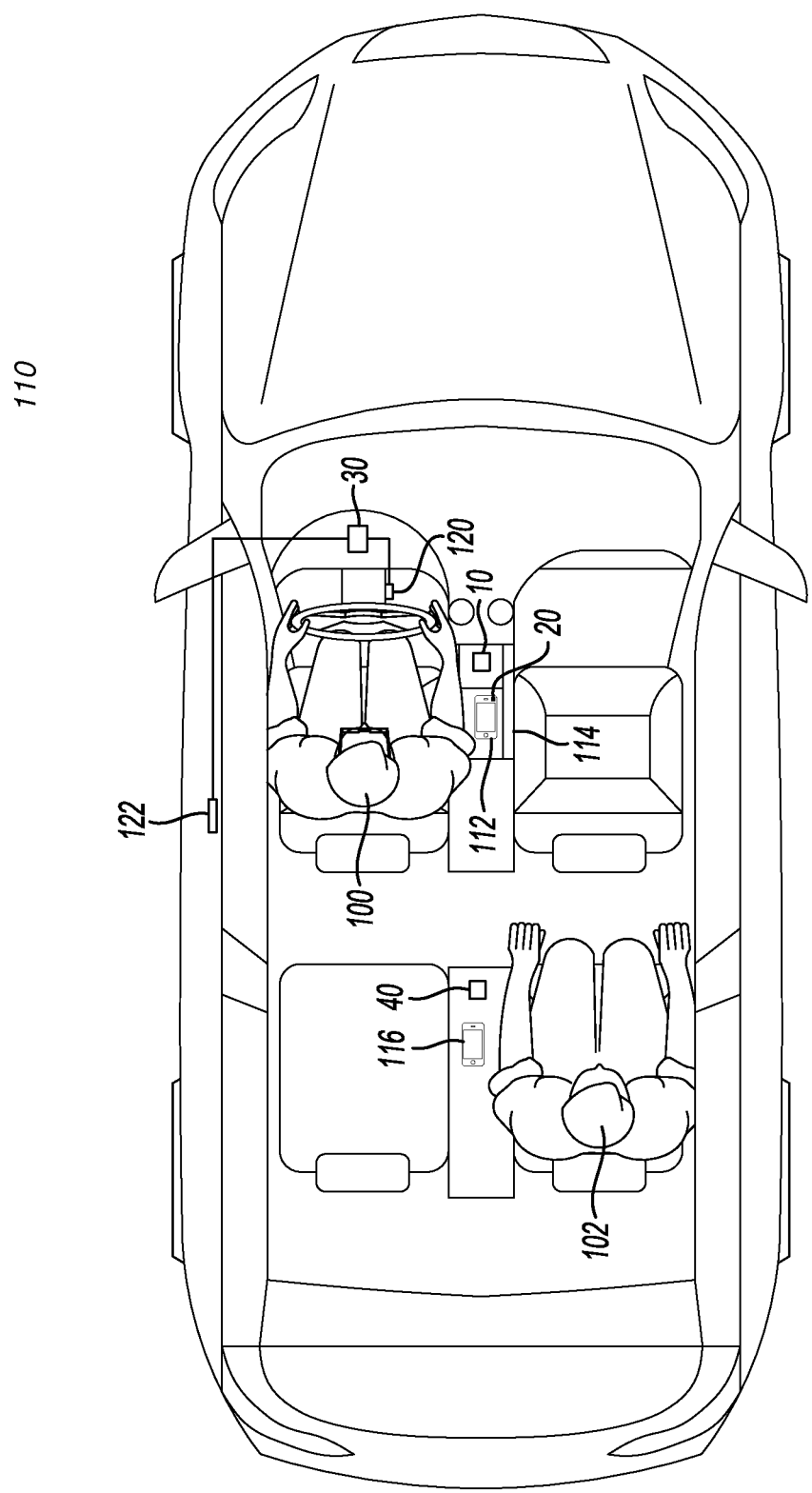

METHOD AND APPARATUS FOR ALERTING A USER TO PRESENCE OF AN ITEM IN A VEHICLE

CROSS-REFERENCE TO RELATED APPLICATIONS

This application claims foreign priority benefits under 35 U.S.C. §119(a)-(d) to GB 1302101.9 filed Feb. 6, 2013, the disclosure of which is hereby incorporated by reference it its entirety.

TECHNICAL FIELD

The invention relates to an apparatus and a method for reminding a user leaving a vehicle of the presence of personal items remaining within the vehicle.

BACKGROUND

Vehicle users can forget to take personal items that they have temporarily stored in their vehicle when they later leave the vehicle. This can cause the user significant inconvenience and annoyance. Also, the forgotten item may have a significant value and may be visible, which could encourage a thief to attempt to break into the vehicle. Typical items often left behind include a mobile phone, wallet, laptop, house keys or sunglasses.

Known radio frequency identification (RFID) systems have been used to locate, track and/or identify items in a wide range of applications. Such systems are wireless and non-contact; they use radio frequency electromagnetic fields to transfer data from a tag attached to the item. The tag contains electronically stored information which may be read by a user using a reader device. The tag can be passive (it does not require a battery) and is powered and read at short ranges using an active reader. When used for locating or tracking, typically the user is informed by the reader when the item enters the range of the reader. However, RFID systems allow only one-way communication (from the tag at the item to the reader being operated by the user).

Near field communication (NFC) devices are a development of RFID technology but allow two-way communication. To date, they have been used mainly for payment systems (such as Google Wallet®)), smart cards, key fobs and the like. Many modern smartphones can operate as an active NFC device (for sending or receiving data).

SUMMARY

In a disclosed embodiment, apparatus for alerting a user to presence within a vehicle of an item having an active near-field communication device (NFCD) associated therewith comprises a passive NFCD located adjacent to a storage compartment within the vehicle and establishing communication with the active NFCD when the item is in the storage compartment, and a controller communicatively connected to the vehicle to detect a journey completion event. In response to the journey completion event, the controller sends a message to the item instructing the item to output an alert if the active and passive NFCDs are in communication with one another.

The controller may be Bluetooth enabled to send the message to the item.

The journey completion event may comprise at least one of a vehicle ignition switch being switched off, opening of at least one vehicle door, and/or
at least one vehicle seat becoming unoccupied.

In a further disclosed embodiment, the apparatus further comprises a second passive NFCD located adjacent to a second storage compartment of the vehicle and establishing communication with the active NFCD when the item is in the second storage compartment. The message instructs the item to output an alert if the active and second passive NFCDs are in communication with one another.

The storage compartment may located adjacent to a front seating position of the vehicle and the second storage compartment may be located adjacent to a rear seating position of the vehicle.

In another disclosed embodiment, a method of alerting a user to the presence within a vehicle of an item having an active near-field communication device (NFCD) associated therewith comprises sending a message from a controller communicatively connected with the vehicle when the controller detects a journey completion event, providing a passive NFCD within the vehicle which establishes communication with the active NFCD when the item is located proximal to the passive NFCD, and outputting an alert from the item in response to receipt of the message if the active NFCD is in communication with the passive NFCD.

BRIEF DESCRIPTION OF THE DRAWINGS

Embodiments of the present invention will now be described by way of example only with reference to the accompanying drawings in which:

FIG. 1 is a simplified and schematic representation of an alerting apparatus within a vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The apparatus comprises a first NFC device 10 which is located within the vehicle and a second NFC device 20 which is associated with the item 112. In this embodiment, the second NFC device 20 and the item 112 are a smartphone which is configured to operate as an NFC reader. Other examples of the item 112 include a wallet or keys, and the second NFC device 20 is provided as an insert or fob respectively. Alternatively, the second NFC device may be attached or otherwise associated with the item, such as a case that contains the item.

In this embodiment, the first NFC device 10 is a simple and inexpensive passive device. It is located at a storage compartment such as at a central console 114 of the vehicle 110. The storage compartment may be concealed. The second NFC device 20, which is the smartphone, is an active device. It should be noted that, unlike typical arrangements, it is an active rather than passive device associated with the item 112. However, the invention takes advantage of the fact that smartphones can be configured to operate as an NFC reader.

The apparatus also includes a controller device 30 which is connected to the vehicle 110. The controller device 30 is connected to the vehicle ignition 120 so that it is "aware" of when the ignition 120 is switched on, which primes the controller device 30, and when the ignition 120 is next switched off. The controller device 30 is Bluetooth enabled and is configured to transmit a message to the smartphone when the ignition 120 is switched off.

Modern vehicles also include door sensors, with a sensor associated with each door. The controller device 30 is connected to the driver's door sensor 122.

The smartphone may include a software application and may be configured to launch this application in response to receiving the message from the controller device 30. The application may access the smartphone's ring tones or haptic unit and an alert is output for a predetermined duration.

When the second NFC device comprises a smartphone configured using a software application, the software application may be initiated in response to receiving the instruction from the controller device.

The controller device and at least one of the first and second NFC devices may be Bluetooth enabled. The controller device may be configured to instruct at least one of the first and second NFC devices using Bluetooth.

A user 100 carrying the smartphone can enter the vehicle 110 and place the smartphone within the storage compartment. The first and second NFC devices then establish communication with each other.

After completing the journey, the user 100 will perform typical tasks such as applying the handbrake, selecting a neutral gear, switching off the ignition 120 and then opening the driver door and exiting the vehicle 110. The apparatus is configured to respond to one or more of these events, and the response is to output an alert, thus reminding the user 100 of the presence of the item 112 so that it is not left behind. The alert may be one or more of auditory, visual and haptic.

In this embodiment, the controller device 30 is connected to both the ignition 120 and the driver door sensor 122 and the controller device 30 sends the message when both switching off of the ignition 120 and opening the driver door occur.

The apparatus may include a third NFC device 40, which is also a passive tag, provided at a second location within the vehicle 110. The second location may be a rear storage compartment of the vehicle 110.

The third NFC device 40 establishes communication with the second NFC device when a second item 116 is placed in the rear storage compartment by a second user 102 or otherwise is initially located proximal to the third NFC device. An alert can also be output in response to a second journey completion event. This second journey completion event may be the same as the first or may be different. For instance, the controller device 30 may be connected to the rear door sensors and the second journey completion event could be the opening of a rear door of the vehicle 110. Using this approach, the apparatus is able to distinguish between the first and second items and respond accordingly. The third NFC device may be configured to establish communication. At least one of the third and second NFC devices may be adapted to output an alert in response to a journey completion event. The journey completion event may comprise the opening of rear door of the vehicle.

The journey completion event may comprise switching off of the vehicle engine. The controller device may be communicatively connected to the vehicle ignition and configured to instruct the NFC device in response to the vehicle ignition being switched off.

Alternatively or in addition, the journey completion event may comprise the opening of a vehicle door. The journey completion event may comprise the opening of the driver or front passenger door. The apparatus may include a door sensor and the controller device may be communicatively connected to the sensor and configured to instruct the NFC device in response to the opening of the door.

Alternatively or in addition, the journey completion event may comprise the user getting off a vehicle seat. The apparatus may include a seat weight sensor and the controller device may be communicatively connected to the sensor and configured to instruct the NFC device in response to the sensor sensing a change from a load to a zero load.

In an alternative embodiment, the vehicle may output the alert. This could be done using, say, the vehicle horn, alarm or lights.

The disclosed method and/or apparatus provide a simple reminder system so that users do not unintentionally leave personal items in their vehicle. This solution is extremely low cost relative to similar systems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for alerting a user to presence within a vehicle of an item having a near-field communication (NFC) reader associated therewith, the apparatus comprising:
    a passive NFC tag located adjacent to a storage compartment within the vehicle and establishing communication with the NFC reader when the item is in the storage compartment; and
    a controller communicatively connected to the vehicle to detect a journey completion event and send a message to the item, the message instructing the item to output an alert if the NFC reader and the passive NFC tag are in communication with one another.

2. The apparatus of claim 1, wherein the controller is Bluetooth enabled to send the message to the item.

3. The apparatus of claim 1, wherein the controller is communicatively connected to a vehicle ignition and the journey completion event comprises the ignition being switched off.

4. The apparatus of claim 1, wherein the controller is communicatively connected to a door sensor associated with at least one vehicle door and the journey completion event comprises opening of the at least one vehicle door.

5. The apparatus of claim 1, wherein the controller is communicatively connected to a seat sensor associated with at least one vehicle seat and the journey completion event comprises the at least one vehicle seat becoming unoccupied.

6. The apparatus of claim 1, further comprising a second passive NFC tag located adjacent to a second storage compartment of the vehicle and establishing communication with the NFC reader when the item is in the second storage compartment, and the message instructs the item to output an alert if the NFC reader and the second passive NFC tag are in communication with one another.

7. The apparatus of claim 6, wherein the storage compartment is located adjacent to a front seating position of the vehicle and the second storage compartment is located adjacent to a rear seating position of the vehicle.

8. Apparatus of claim 7, wherein the journey completion event comprises opening of a rear door of the vehicle and the message instructs the item to output the alert if the NFC reader is proximal to the second passive NFC tag.

9. Apparatus for alerting a user to presence within a vehicle of an item having a near-field communication (NFC) reader associated therewith, the apparatus comprising:

a first passive NFC tag located adjacent to a first storage compartment within the vehicle and establishing communication with the NFC reader when the item is in the first storage compartment;

a second passive NFC tag located adjacent to a second storage compartment within the vehicle and establishing communication with the NFC reader when the item is in the second storage compartment; and a controller communicatively connected to the vehicle to detect a journey completion event and send a message to the item, the message instructing the item to output an alert if the NFC reader is in communication with either of the first and the second passive NFC tags.

10. The apparatus of claim 9, wherein the first storage compartment is located adjacent to a front seating position of the vehicle and the second storage compartment is located adjacent to a rear seating position of the vehicle.

11. The apparatus of claim 9, wherein the controller is Bluetooth enabled, to send the message to the item.

12. The apparatus of claim 9, wherein the controller is communicatively connected to a vehicle ignition and the journey completion event is the ignition being switched off.

13. The apparatus of claim 9, wherein the controller is communicatively connected to a door sensor associated with at least one vehicle door and the journey completion event comprises opening of the at least one vehicle door.

14. The apparatus of claim 9, wherein the controller is communicatively connected to a seat sensor associated with at least one vehicle seat and the journey completion event comprises the at least one vehicle seat becoming unoccupied.

15. A method comprising:

transmitting a message from a controller communicatively connected with a vehicle upon occurrence of a journey completion event;

establishing communication between a passive near-field communication (NFC) tag within the vehicle and a NFC reader associated with an item when the item is proximal to the passive NFC tag; and outputting an alert from the item in response to the message if the NFC reader is in communication with the passive NFC tag.

16. The method claim 15, wherein the passive NFC tag is provided adjacent to a storage compartment of the vehicle.

17. The method of claim 15, wherein the journey completion event comprises switching off of a vehicle engine.

18. The method of claim 15, wherein the journey completion event comprises opening of a vehicle door.

19. The method of claim 15, wherein the journey completion event comprises a vehicle seat becoming unoccupied.

20. The method of claim 15, further comprising:

providing a second passive NFC tag within the vehicle at a location separate from the passive NFC tag which establishes communication with the NFC reader when the item is located proximal to the second passive NFC tag; and outputting an alert from the item in response to receipt of the message if the NFC reader is in communication with the second passive NFC tag.

* * * * *